Dec. 11, 1928.

H. H. BARBER

PORTABLE CONVEYER.

Re. 17,160

Original Filed Nov. 4. 1918

3 Sheets-Sheet 1

Witness:
[illegible]

Inventor:
Harry H. Barber,
by Burton & Burton
his Attys.

H. H. BARBER
Dec. 11, 1928. PORTABLE CONVEYER Re. 17,160
Original Filed Nov. 4. 1918 3 Sheets-Sheet 2
Fig. 2.
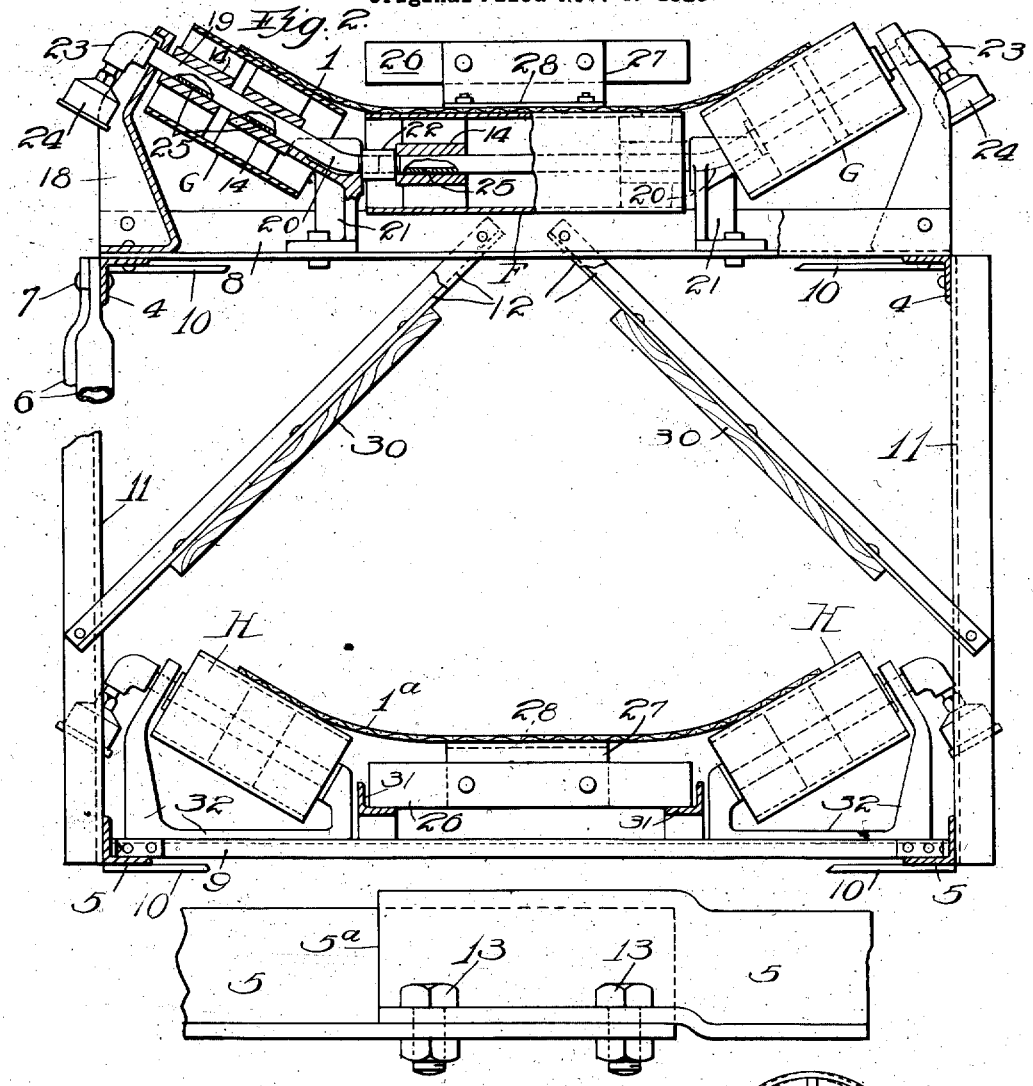
Fig. 3.
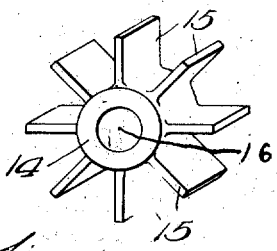
Fig. 4.
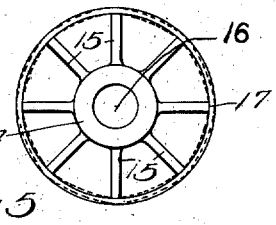
Fig. 5
Inventor:
Harry H. Barber;
by Burton & Burton
his Attys.
Witness:
[illegible]

Dec. 11, 1928. H. H. BARBER Re. 17,160

PORTABLE CONVEYER

Original Filed Nov. 4. 1918 3 Sheets-Sheet 3

Inventor:
Harry H. Barber;
by Burton & Burton
his Attys.

Witness:

Reissued Dec. 11, 1928. Re. 17,160

UNITED STATES PATENT OFFICE.

HARRY H. BARBER, OF AURORA, ILLINOIS, ASSIGNOR TO BARBER-GREENE COMPANY, OF AURORA, ILLINOIS, A CORPORATION OF ILLINOIS.

PORTABLE CONVEYER.

Original No. 1,589,091, dated June 15, 1926, Serial No. 260,934, filed November 4, 1918. Application for reissue filed May 7, 1928. Serial No. 275,946.

This invention relates to a conveyer designed to be mounted and operated as a portable unit and adapted for a wide variety of uses, and it is among the objects of this invention to provide a simplified mounting for the boom whereby the same may be rolled or wheeled from place to place and turned in an exceedingly small area, and in which the conveyer drive is unaffected by variations in the inclination of the boom.

The particular structure illustrated in connection with this invention comprises broadly a two-wheeled, tiltable mounting or support which can be readily turned or shifted in a small coal yard or the like and in which the two-wheeled support may roll and tilt during the raising or lowering of the boom in cases where it is desired to maintain the nose or the loading end at a predetermined point and without affecting the conveyer drive and in which the nose of the boom can be lowered in a pit below the horizontal supporting plane of the mounting.

The conveyer also embodies a novel conveyer boom. In addition, further advantages and novel features exist, which will be pointed out as the description proceeds.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 2 is a transverse section on a larger scale showing details of the conveyer frame and also of the conveyer belt and rollers on which it is mounted for travel.

Figure 3 is a detail plan view showing the form of joint by which the frame sections are detachably connected.

Figure 4 is a perspective view of a hub or spider used in constructing the belt rollers.

Figure 5 is an end elevation of a completed roller showing the spider inserted in the tubular rim.

Figures 1, 6, 9, 10:
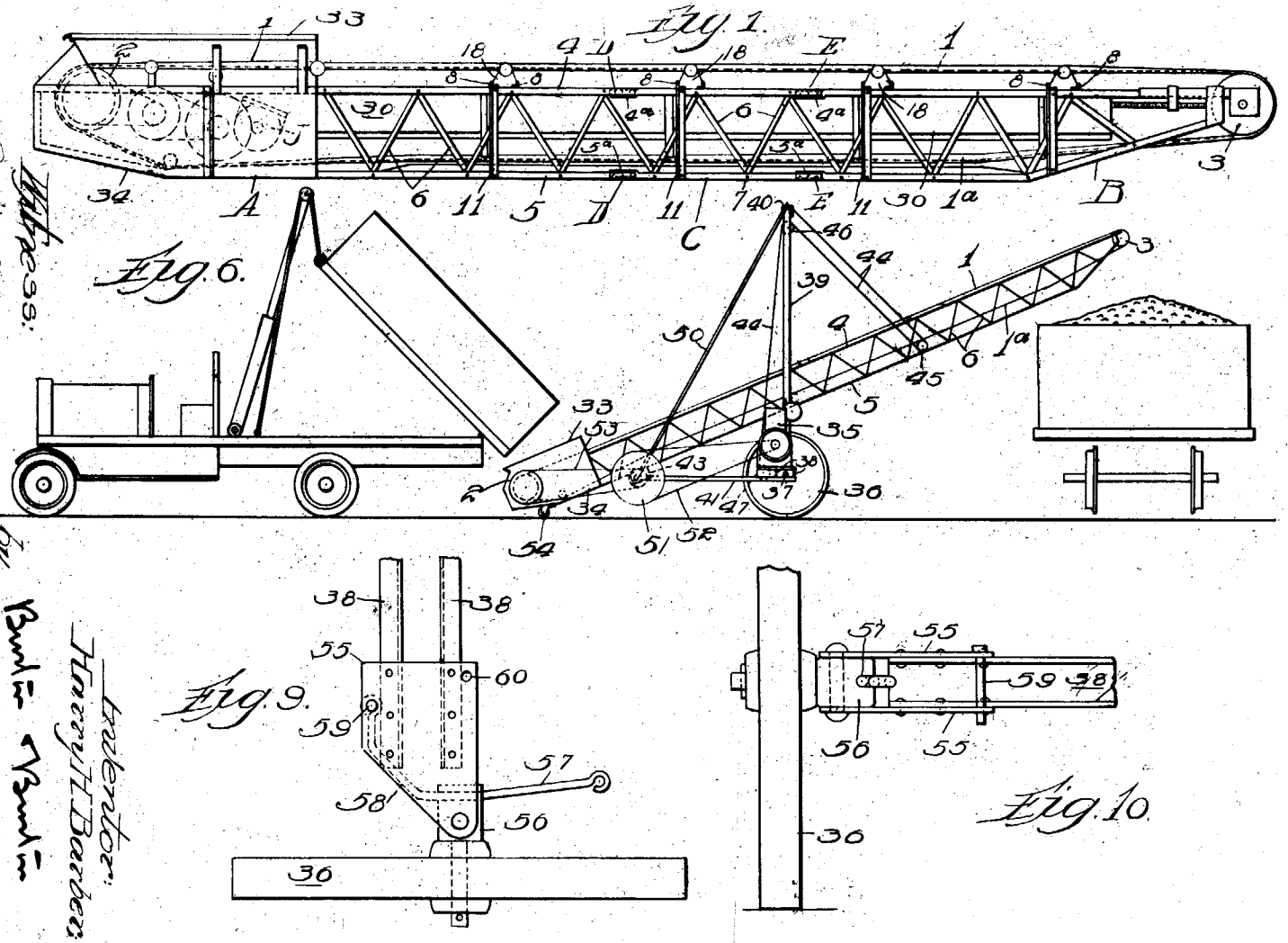
Figure 1 is a side elevation of a conveyer unit embodying this invention.
Figure 6 is a diagrammatic side elevation illustrating the mode of use of the type of conveyer to which this invention relates, and including a carriage in the form of a portable tower from which the conveyer frame may be adjustably supported at various angles to bring its discharge or delivery end at exactly the right height.
Figure 9 is a detail plan view showing the wheel mounting of the carriage shown in Figure 8.
Figure 10 is a detail elevation of the part illustrated in Figure 9.

The conveyer illustrated in the drawings consists briefly of a frame provided at its opposite ends with head and tail pulleys respectively and with a conveyer belt arranged to run over said pulleys, together with suitable gearing for applying power to drive the belt. The frame may be mounted either horizontally for merely transferring material from one point to another in horizontal direction or, as is more frequently the case, may be supported obliquely so that the conveyer belt will elevate material from the receiving end to the discharge end. A typical use is illustrated in Figure 6 in which bulk material is either dumped or shoveled from a truck into the receiving hopper of the conveyer from which it is carried on the conveyer belt to the upper and discharge end for delivery into a freight car.

Referring first to Figure 1, the conveyer belt is shown at 1 with its upper ply arranged to run off from a head pulley or driving drum 2 and over a tail pulley 3 at the opposite end of the frame. The frame consists of two parallel side members formed as steel trusses whose upper chord 4 and lower chord 5 may be formed by standard steel angle bars and connected together by lacing composed of short sections of pipe or tubing 6, whose extreme ends are flattened and secured to the vertically extending parts of the angles 4 and 5, as by rivets 7, indicated in Figures 1 and 2. This construction makes a very stiff, and at the same time a very light form of truss which may be rapidly and economically assembled. These side frames or trusses are transversely connected at suitable intervals by cross members such as the angle bars 8 and 9, seen in Figure 2, and crossed pairs of diagonals 10 in both the upper and lower panels of the cross frame will secure the latter against collapse.

In addition to the diagonal lacing members 6, the side frames are provided with vertical angle bars 11 arranged in the same vertical planes as the cross bars 8, so that diagonal braces 12 may be connected to these members for reinforcing the box like frame thus formed for the conveyer.

Preferably these conveyer frames are made up of standard units, and Figure 1 illustrates an assembly of the three different units comprising a standard drive end, A, in which the head pulley 2 is carried, a standard discharge end B, by which the tail pulley 3 is carried, and a standard intermediate section C, which is the portion of the frame shown between the joints D and E, at which it is connected with the drive section A and discharge section B, respectively. To simplify the assembly of these sections, the end portions 4ª and 5ª, of the longitudinal angle members, are offset at one end of each standard section to the extent indicated in Figure 3, so that they may lap within the end portions of the corresponding members 4 and 5 of the next section and can be connected or spliced thereto by fastening bolts 13. This permits as many intermediate sections C to be inserted between a pair of end sections A and B as may be needed to produce a conveyer of the desired length. It will be obvious that to reduce the number of joints as shown at D and E to a minimum, the standard sections C may be manufactured in a series of different lengths, such lengths being preferably multiples of the minimum length of such intermediate sections.

The belt 1 is supported on carrier rollers which are made up of elements illustrated in Figures 4 and 5. A cast spider comprising a hub portion 14 with radiating arms 15 is first bored out approximately at the axis of its hub. Through the bore 16 there is then inserted a carefully centered mandrel which is mounted on centers in a grinding machine, whereupon the ends of the radial arms 15 are ground off just enough to make the spider a tight drive fit for pipe or tubing 17 which is to serve as the the rim or tire of the roller. The spider is then forced or driven longitudinally into a section of this tubing 17 to the desired position, as indicated in Figure 5; owing to the elasticity of the tubular wall 17 it may thus be stretched into an approximately polygonal form as indicated by the dotted line in Figure 5, but on account of the multiplicity of the radial arms 15 the final form of the roller will be nearly enough cylindrical to serve all practical purposes. Figure 2 shows rollers of this type mounted on the conveyer frame. At its opposite ends the cross-member 8 supports two brackets 18 in which are secured the ends of a bent tubular axle 19 for the rollers, the bends 20 of said axle being lodged in upwardly-open cradle brackets 21 also carried on the member 8. Preferably the tubular axle 19 is formed of standard pipe and to facilitate its assembly it is made in two sections joined by a coupling 22 so that before the two sections are coupled together, the middle roller F and one of the end rollers G can be entered on the longer section of the axle from opposite ends thereof, while the other roller G can be slid onto the short axle section from its outer end. The two sections are then secured together by the coupling 22 and lodged in the cradle bracket 21, whereupon the end brackets 18 may be engaged with the end portions of the axle 19 and the elbows 23 applied thereto with their grease cups 24, as shown in Figure 2.

Small apertures 25 in the tubular axle 19 are positioned to register with the hub portions 14 of the spiders in the rollers F and G for feeding to the bearing surfaces the lubricant supplied through grease cups 24. This construction permits a large supply of lubricant to be carried in the hollow journal or axle 19, thus minimizing trouble from inadequate lubrication.

Figure 7:
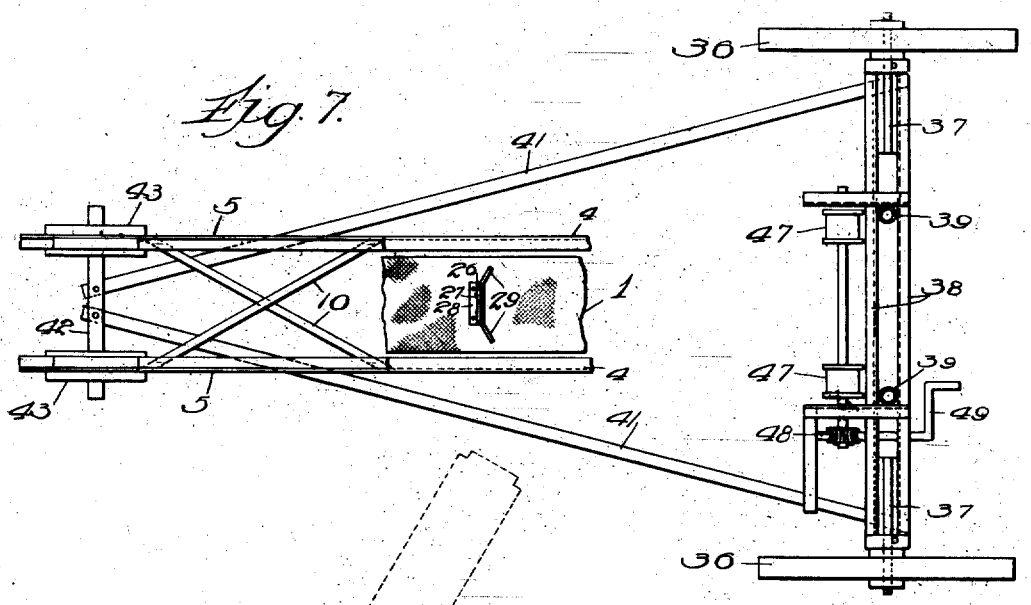
Figure 7 is a detail plan view, partly in section, to illustrate certain features of the tower shown in Figure 6.

To enable the belt 1 to hold a load of material, particularly bulk material, even when operating at a relatively steep incline, it is provided with flights 26 which are shown as bars of flat stock extending crosswise of the belt through the middle portion of its width but not to its extreme edges, each bar 26 being supported by an angle member 27 whose width transversely of the belt is much less than that of the bar itself, so that the securing of its foot portion 28 to the belt will not seriously interfere with the troughing thereof which is effected by the inclined rollers C shown in Figure 2. Preferably as indicated in Figure 7, the end portions 29 of the bar 26 may be slightly bent with respect to the middle portion which is secured to the supporting angle 27, such bending being in the direction of travel of the belt 1, and thus tending to center the load of bulk material on the belt and prevent spillage from the edges of the belt. Within the box-like conveyer frame there are mounted the obliquely-disposed boards 30 secured to the diagonal braces 12 and serving as shields to protect the lower ply of the belt by shedding any spillage which may occur over the edges of the upper ply.

At the lower or return ply of the belt 1, indicated at 1ª on Figure 2, the flights 26 are of course inverted and suspended from the lower surface of the belt. Guide rails formed of inwardly-facing angle bars 31 are arranged to accommodate the flight bars 26 between them and, to prevent undue dragging of the bars upon these rails, the extreme lateral portions of the belt beyond the end of the bars 26 are supported upon obliquely-disposed rollers H which are substantially similar in construction to the rolls G, which serve for troughing the upper ply of the belt 1. However, there being no middle roller corresponding to the upper rollers F, the rolls H are shown as supported each upon an individual axle carried in a bracket 32 lodged upon the cross-member 9 of the frame.

When electric power is available for driving a conveyer of this type, it may be equipped with an electric motor which is preferably mounted at the receiving end of the frame, adjacent the drive pulley 2 and below the receiving hopper 33; such a motor is indicated at J in Figure 1 in dotted line, and a suitable gearing connecting the motor to the pulley 2 is likewise indicated, such assembly of motor and gearing being enclosed for protection from dust or injury by means of suitable steel plates 34, forming a housing under the receiving hopper 33 at this end of the frame. With a motor of this type the power is applied to the conveyer merely by an electric cable leading to a source of electrical energy, and the conveyer can be readily adjusted to any desired position of operation without interfering in any way with the power connection.

Where electric power is not available and the conveyer is mounted on a carriage such as shown in Figure 6, a small gasoline engine may be supported on the carriage itself, as indicated at 35. This carriage, which is shown more in detail in Figure 7, consists of a pair of wheels 36 whose stub axles 37 are secured between transverse frame bars 38, in which there are also mounted the vertical posts 39, connected at their upper ends by a suitable cross member 40 to form a tower. From the transverse frame members, 38 horizontal braces 41 extend rearwardly to a cross-beam 42 which is pivotally engaged in blocks 43 rigidly attached to the conveyer frame, of which only a fragment is shown in Figure 7. By this means the conveyer frame is pivotally connected to the carriage frame only at the axis of the cross-beam 42, and as the crossbeam 42 is a considerable distance above the ground, it is possible to lower the nose of the boom into a pit below the horizontal surface of the ground. From the top of the tower composed of the uprights 39 and cross member 40, flexible cables 44 are shown extending around pulleys 45 suitably located on the conveyer frame for minimizing the strain thereon; from the pulleys 45 the cables 44 pass around other pulleys 46 and down to the drums 47 supported on the carriage frame and constituting a windlass which may be operated thru a worm gear 48 and crank 49 for raising or lowering the delivery end of the conveyer frame. Oblique tie rods 50 reaching from the top of the tower to the blocks 43 serve to reinforce the carriage frame. Throughout the raising or lowering adjustment of the conveyer frame with respect to the carriage frame, the axis of the cross-beam 42 will not change its relation to the carriage frame, hence a counter-shaft carrying a belt wheel 51 may be journalled at this axis and power transmitted thru said counter-shaft by means of a belt 52 from the engine 35 and a second belt 53 to the drive pulley 2 of the conveyer, and the relation of these driving elements will remain undisturbed throughout the adjustment of position of the conveyer frame, and the belt 1 thereon. By furnishing the receiving end of the conveyer frame with a caster wheel 54 the entire assemblage can be readily moved about for use at any desired place.

An important feature of the conveyer resides in the fact that if the nose of the boom has been positioned to receive material from a car or truck as shown in Figure 6, it is possible to raise or lower the boom without materially disturbing the nose. Assuming that the nose has been anchored in position, and the rear part of the boom is elevated. As the boom is elevated, the rod 42 that pivotally connected the boom with the braces 41 will be elevated and moved forwardly, and such braces 41 will be caused to assume an inclined position and also move forwardly. This movement of the braces will cause the wheels 30 to roll or advance and the vertical posts or mast 39 to tilt. Due to the tiltable and rolling characteristics of the two-wheeled truck, the same can adjust itself to variations in the elevation of the boom in order that the nose thereof may be maintained at a predetermined point.

It will be evident that the two-wheeled mounting permits the conveyer to be turned and shifted in a very small area, a feature which is greatly desired in small coal yards or in places of limited movement. In addition to the simplicity of the structure, which greatly reduces the cost, the two-wheeled support is adapted to tilt and roll during the raising and lowering of the boom, provided the nose or loading end of the boom is anchored at a predetermined point. This feature of construction is especially advantageous when the conveyer is used for unloading coal from a gondola car having a bottom hopper, since the nose of the boom can be maintained at its position under the hopper while the rear end can be raised or lowered as desired. Furthermore, in addition to the raising and lowering of the boom without materially moving the nose thereof, it is also possible to transversely shift the conveyer if desired. In brief, the conveyer involving this invention is exceedingly simple and the important advantage of the simplicity resides not only in the reduction in the cost of manufacture but also in the fact that it greatly increases the mobility of its use in an exceedingly small area and in other ways greatly facilitates the uses to which it is adapted to be put.

Figure 8:
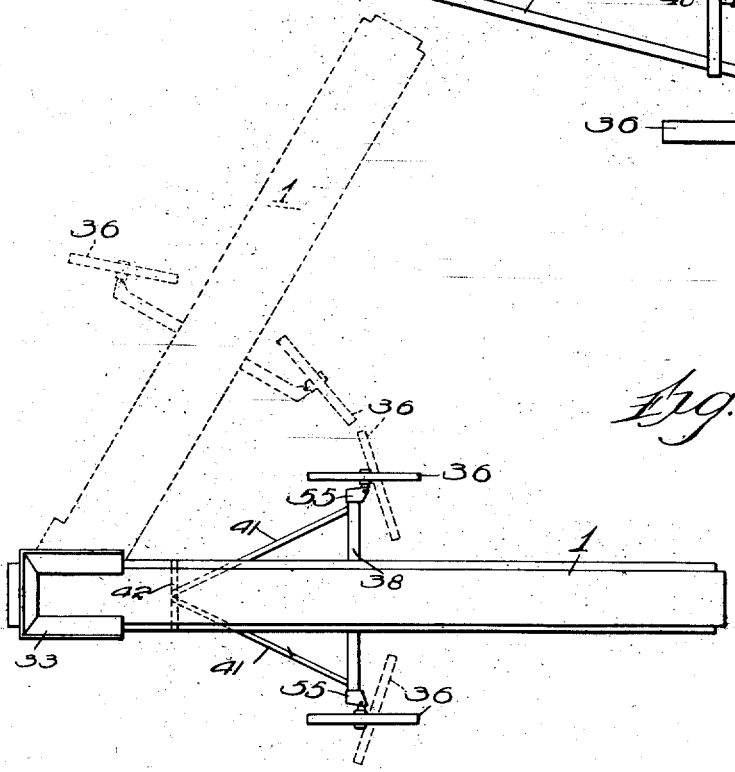
Figure 8 illustrates a modified form of carriage for a tower or other support for a portable conveyer of this type.

In using a conveyer of this type to handle bulk material such as sand, gravel or coal which is to be received at one point and distributed in a pile or piles, it is frequently convenient to be able to keep the receiving end of the conveyer at such receiving point and gradually shift the delivery end. For this purpose a modification of the carriage shown in Figure 6 is shown in Figures 9 and 10, as consisting in mounting the wheels 36 on very short stud axles vertically swiveled as between plates 55 carried at the end of the frame members 38; the block 56, from which the stub axle projects, is provided with two arms 57 and 58, respectively, each terminating in an eye. For ordinary travel of the carriage in direction longitudinal with respect to the conveyer frame, the wheels will be locked at a position shown in full line in Figure 8, by the insertion of a locking pin 59 in apertures in the plate 55, and engaging the eye of the arm 58, as indicated in Figure 9, but for adjusting the wheels to extend transversely of the carriage, as indicated in dotted lines in Figure 8, the arms 57 may be swung against the frame members 38 so as to permit insertion of the locking pin 59 thru apertures 60 in the plate 55 to engage the eyes at the end of the arms 57. This permits the wheel 36 to travel in an arc about a center located under the receiving hopper 33 as to such a position of the conveyer as is indicated in dotted outline in Figure 8, for distributing the material delivered by it into a semicircular pile or into a series of adjacent piles. It will be obvious that such adjustment of the conveyer involves the expenditure of considerably less effort than if it must be wheeled back and forth longitudinally for shifting the position of its discharge end.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. In a portable conveyer comprising a longitudinally extending frame composed of trusses and upper and lower transverse members connecting the upper and lower chords of the trusses, respectively, head and tail pulleys carried by the frame at its opposite ends, an endless conveyer belt on said pulleys, the upper ply running over the upper transverse members and the lower ply returning between said upper and lower transverse members, diagonal transverse braces extending downwardly from the upper transverse members, and shields carried by said braces over the lower ply of the belt.

2. A portable conveyer comprising in combination a longitudinally extending frame with head and tail pulleys at its opposite ends supporting an endless conveyer belt, a carriage consisting of a transverse frame with laterally spaced uprights and axles with carrying wheels at the ends of the transverse frame, the conveyer frame being inclined between said uprights with its lower end resting on the ground; suitable tackle supported by the uprights and connected to the conveyer frame for raising and lowering the latter, a cross beam secured to the conveyer frame at a distance upward from its lower end and braces attached to said cross beam diverging therefrom and secured to the extreme ends of the transverse frame.

3. A portable conveyer comprising in combination a longitudinally extending frame with head and tail pulleys at its opposite ends supporting an endless conveyer belt, a carriage comprising a transverse member and laterally spaced uprights with axles and carrying wheels at the ends of the transverse member, suitable tackle supported by the uprights and serving to suspend the conveyer frame between them with its receiving end resting on the ground, and bracing means extending in approximately horizontal direction from the transverse frame member to pivotal connection with the conveyer frame intermediate its receiving end and said transverse member.

4. In the combination defined in claim 3, oblique braces extending from the upper portions of the uprights substantially to the pivotal axis at which the horizontal braces are attached to the conveyer frame.

5. In the structure defined in claim 2, said cross-beam being pivotally attached to the conveyer frame.

6. In the structure defined in claim 2, the cross-beam extending beyond the frame, and a stepped pulley journaled thereon; a power device mounted on the carriage, power-transmitting means from the power device to one of the steps of said pulley, and another power-transmitting means from another step of the stepped pulley to the head pulley at the power-receiving end of the conveyer.

7. In the structure defined in claim 2, the axles of the carrying wheels being swivelled to the transverse frame on a vertically pivoted block; a pair of plates overhanging the end of the transverse frame, supporting means for pivoting the block, a pair of arms projecting from the block, each arm terminating in an eye, and a locking pin for engaging the said eye, arranged to lock one of the arms to the said overhanging plates, thereby securing the carrying wheels in planes parallel to each other, or in a plane parallel to the transverse frame.

8. The combination of a transversely flexible conveyer belt, troughing rollers engaging and upbending its marginal portions, and flights transversely mounted on the belt secured only to the middle portion thereof with their laterally extending portions spaced away from the belt surface.

9. The combination of a transversely flexible conveyer belt, troughing rollers engaging and upbending its marginal portions, and flights transversely mounted on the belt secured only to the middle portion thereof, the lateral extent of said flights stopping short of the extreme marginal portions of the belt.

10. The combination of a transversely flexible conveyer belt, troughing rollers engaging and upbending its marginal portions, and flights transversely mounted on the belt, each comprising a bar spaced from the belt surface, and a foot member supporting said bar and secured only to the middle portion of the belt.

11. The combination of a transversely flexible conveyer belt, troughing rollers engaging and upbending its marginal portions and flights transversely mounted on the belt secured only to the middle portion thereof, guiding means for the return ply of the belt comprising obliquely disposed rollers supporting the marginal portions of the belt, and a pair of longitudinal guide rails of angle section opening inwardly and opposite each other for engaging opposite ends of the flights on the belt.

12. In a conveyer truck, an inclined boom adapted to have one end located at a predetermined point, a two-wheeled support pivotally connected to said boom above the nose thereof and movably responsive to variations in the inclination of said boom for maintaining said end at said predetermined point.

13. In a conveyer truck, an inclined boom adapted to have one end located at a predetermined point, a two-wheeled support, and a member having a pivotal connection with said boom above the nose thereof and connected to said support for causing said support to tilt during the raising or lowering of the boom for maintaining said end at said predetermined point.

14. In a conveyer, a shiftable fulcrum member, a conveyer boom mounted thereon, means for raising and lowering said boom, connections between said boom and fulcrum member, said connections being pivotally attached to said boom above the nose thereof for shifting said fulcrum member during the raising and lowering of said boom, a conveyer on said boom, and driving mechanism for said conveyer extending adjacent said connections for maintaining an effective drive for all inclinations of the boom.

15. Mechanism for supporting a conveyer boom at various inclinations and for transversely shifting its discharge and comprising a tiltable support having a single pair of adjustable rolling members, and a brace connecting an intermediate point of said boom with said support whereby said support may adjust itself for various inclinations of the boom without disturbing its lower end.

16. The combination with an inclined conveyer boom adapted to have its lower end positioned at a predetermined point, of a longitudinally and transversely rolling support for the boom, means on said support for varying the inclination of the boom, and pivotal connections between an intermediate point of said boom and support effective during the varying of the inclination of the boom for causing a tilting and rolling movement of said support without materially disturbing the lower end of said boom.

17. In a portable conveyer, a two-wheeled truck, a conveyer boom thereon, cable means for raising and lowering said boom, and a connection between said truck and boom above the nose thereof, said connection causing said two-wheeled truck to roll and tilt during the raising and lowering of said boom.

18. In a portable conveyer, a two-wheeled truck including a mast, a conveyer boom thereon, a pulley on said mast, a cable connected to said boom and trained over said pulley, means on said truck for operating said cable, and a brace extending from said truck and pivotally connected to said boom above the nose thereof for allowing said mast to tilt during the raising and lowering of said boom.

19. In a conveyer, a two-wheeled standard, a boom, cable means for supporting the boom upon said standard for raising and lowering the same with respect thereto, braces extending from said two-wheeled standard and pivotally connected to said boom above the nose thereof and upon one side of said standard whereby said standard may roll and tilt during the raising and lowering of the boom.

20. In a portable conveyer, a carriage including spaced tiltable standards, a boom between said standards, a tackle supported by said standards for raising and lowering said boom, a brace extending from said carriage and pivotally connected to said boom at a suitable elevation above the ground, whereby the nose of the boom may be lowered into a pit below the surface of the ground, a conveyer on said boom, power means on said carriage and a driving connection between said power means and conveyer, said driving connection extending adjacent said brace for maintaining an effective drive for all inclinations of the boom.

21. In a portable conveyer, a carriage including a tiltable standard, a boom, cable means for supporting said boom upon said standard for elevating and lowering movements, and a brace extending from said carriage and pivotally connected to said boom above the nose thereof, said brace being adapted for tilting said standard during the elevation or lowering of said boom.

22. In a conveyer truck, an inclined boom susceptible of having its nose located at a predetermined point, a two wheeled support, means for raising and lowering said boom, and a brace extending from said truck and pivotally connected to said boom above the nose thereof whereby said nose may descend into a pit below the surface of the ground, said brace causing said truck to be movably responsive during the raising and lowering of said boom for maintaining said nose at said predetermined point.

In testimony whereof I have hereunto subscribed my name at Aurora, Kane County, Illinois.

HARRY H. BARBER.

CERTIFICATE OF CORRECTION.

Reissue Patent No. 17,160. Granted December 11, 1928, to

HARRY H. BARBER.

It is hereby certified that error appears in the printed specification of the above numbered patent requiring correction as follows: Page 5, line 63, claim 15, for the word "and" read "end"; and that the said Letters Patents should be read with this correction therein that the same may conform to the record of the case in the Patent Office.

Signed and sealed this 19th day of March, A. D. 1929.

M. J. Moore,
Acting Commissioner of Patents.

(Seal)

above the nose thereof, said brace being adapted for tilting said standard during the elevation or lowering of said boom.

22. In a conveyer truck, an inclined boom susceptible of having its nose located at a predetermined point, a two wheeled support, means for raising and lowering said boom, and a brace extending from said truck and pivotally connected to said boom above the nose thereof whereby said nose may descend into a pit below the surface of the ground, said brace causing said truck to be movably responsive during the raising and lowering of said boom for maintaining said nose at said predetermined point.

In testimony whereof I have hereunto subscribed my name at Aurora, Kane County, Illinois.

HARRY H. BARBER.

CERTIFICATE OF CORRECTION.

Reissue Patent No. 17,160. Granted December 11, 1928, to

HARRY H. BARBER.

It is hereby certified that error appears in the printed specification of the above numbered patent requiring correction as follows: Page 5, line 63, claim 15, for the word "and" read "end"; and that the said Letters Patents should be read with this correction therein that the same may conform to the record of the case in the Patent Office.

Signed and sealed this 19th day of March, A. D. 1929.

M. J. Moore,
Acting Commissioner of Patents.

(Seal)